United States Patent
Koyama et al.

[11] Patent Number: 5,826,422
[45] Date of Patent: Oct. 27, 1998

[54] FUEL REFORMING APPARATUS AND ELECTRIC POWER GENERATING SYSTEM HAVING THE SAME

[75] Inventors: Kazuhito Koyama; Shigehisa Sugita; Shinya Marushima; Yuji Makino; Kazuhiro Gonda, all of Hitachi, Japan

[73] Assignee: Hitachi, Ltd., Tokyo, Japan

[21] Appl. No.: 901,266

[22] Filed: Jul. 28, 1997

Related U.S. Application Data

[63] Continuation of Ser. No. 508,376, Dec. 28, 1995, abandoned.

[30] Foreign Application Priority Data

Jan. 9, 1995 [JP] Japan ......................................... 7-1019

[51] Int. Cl.⁶ .................................................. F02B 43/00
[52] U.S. Cl. .......................... 60/39.12; 60/39.55; 60/723; 431/7; 431/328; 422/177
[58] Field of Search .............................. 60/39.12, 39.55, 60/723; 431/7, 170, 326, 328, 351, 352, 353; 422/171, 177

[56] References Cited

U.S. PATENT DOCUMENTS

| | | | |
|---|---|---|---|
| 4,202,829 | 5/1980 | Kendall et al. | 431/7 |
| 4,397,356 | 8/1983 | Retallick | 60/723 |
| 4,884,529 | 12/1989 | Byrnes | 60/39.55 |
| 5,461,854 | 10/1995 | Griffin, Jr. | 60/39.55 |
| 5,522,356 | 6/1996 | Palmer | 60/39.55 |
| 5,694,761 | 12/1997 | Griffin, Jr. | 60/39.55 |

FOREIGN PATENT DOCUMENTS

| | | |
|---|---|---|
| 835815 | 5/1960 | United Kingdom. |
| 1152008 | 5/1969 | United Kingdom. |
| 1354073 | 5/1974 | United Kingdom. |
| 1360988 | 7/1974 | United Kingdom. |
| 1469287 | 4/1977 | United Kingdom. |

*Primary Examiner*—Charles G. Freay
*Attorney, Agent, or Firm*—Antonelli, Terry, Stout, & Kraus, LLP

[57] ABSTRACT

A cylindrical fuel reforming apparatus covered with a thermal insulating layer 16 has a fuel flow passage 1 contoured by a cylindrical contour wall 2 in its central axial direction, and a reforming catalyst bed 3 is disposed in the middle of the flow passage for reforming gas, flowing from the upstream end of the fuel flow passage 1, into a proper reformed gas. A cooling jacket 10 is arranged upstream of the reforming catalyst bed 3 so as to surround the fuel flow passage 1 and the cooling jacket is supplied with steam 11 for cooling the cylindrical contour wall 2. There are provided in the cylindrical contour wall 2 upstream of the reforming catalyst bed 3 a plurality of injection nozzles 15 for effecting communication between the cooling jacket 10 and the fuel flow passage 1 so that the steam 11 introduced into the cooling jacket 10 is allowed to flow into the fuel flow passage 1.

31 Claims, 7 Drawing Sheets

FUEL REFORMING APPARATUS AND ELECTRIC POWER GENERATING SYSTEM HAVING THE SAME

This is a continuation of application Ser. No. 08/580,376, filed Dec. 28, 1995, now abandoned.

BACKGROUND OF THE INVENTION

The present invention relates to a fuel reforming apparatus and a electric power generating system having the fuel reforming apparatus, and more particularly to a fuel reforming apparatus of direct heat exchange type suitable for a gas turbine electric power generating system and a electric power generating system having the fuel reforming apparatus.

A fuel reforming apparatus of indirect heat exchange type, a fuel reforming apparatus of direct heat exchange type and the like have been known as fuel reforming apparatuses for reforming a raw fuel such as a hydrocarbon into a hydrogen enriched gas.

Among them, the fuel reforming apparatus of indirect heat exchange type comprises a reactor pipe having a reforming catalyst and a burner for giving heat to the reactor pipe, in which a raw fuel entered into the reactor pipe through one end of the reactor pipe is reformed into a hydrogen enriched gas using the reforming catalyst filled inside of the reactor pipe while the reactor pipe is being heated with the burned gas from the burner.

On the other hand, the fuel reforming apparatus of direct heat exchange type comprises a fuel flow passage having a reforming catalyst inside, in which a part of a raw fuel is partially oxidized (burned) with air inside the flow passage, and the obtained high temperature gas to be reformed is reformed into a hydrogen enriched gas using a reforming catalyst bed. The fuel reforming apparatus of direct heat exchange type is used in the field of chemical industry.

Gas turbine electric power generating systems having a fuel reforming apparatus are disclosed in, for example, Japanese Patent Application Laid-Open No.2-286835 (1990), Japanese Patent Application Laid-Open No.5-332166 (1993), Japanese Patent Application Laid-Open No.5-332167 (1993).

Since the fuel reforming apparatus of indirect heat exchange type described above has the burner for heating the reactor pipe, the size of the apparatus becomes large. Further, if the exhaust gas of the turbine is used for the heat source, it is difficult to obtain the reforming temperature of approximately 700° C. required for the reforming reaction. In other words, taking the efficiency into consideration the exhaust gas temperature of the gas turbine is generally set to nearly 600° C. in a highest case and around 500° C. in a common case. Therefore, it is difficult to obtain the reforming temperature of approximately 700° C. required for the reforming reaction.

In these points, the fuel reforming apparatus of direct heat exchange type is small in size since a part of the raw fuel is partially oxidized (burned) and the sufficiently high reforming temperature required for the reforming reaction can be obtained. Therefore, the fuel reforming apparatus of direct heat exchange type is better than the fuel reforming apparatus of indirect heat exchange type.

The inventors tried to apply the fuel reforming apparatus of direct heat exchange type to a gas turbine electric power generating system, but the following problem are revealed. That is, in the fuel reforming apparatus of direct heat exchange type, the fuel flow passage performing the partial oxidization (burning) is formed of firebricks, and the heat load fluctuation applied to the firebricks is small in an fuel reforming apparatus in the field of chemical industry which is used for a long period under a constant operating condition. Therefore, cracks hardly occur in the firebricks. On the other hand, the heat load fluctuation applied to the firebricks is large in a gas turbine electric power generating system, cracks are apt to occur in the firebricks. Therefore, if the conventional fuel reforming apparatus of direct heat exchange type is directly applied to a gas turbine electric power generating system, there is a possibility to cause cracks in the firebricks. On addition to this, there is a possibility to cause a secondary failure by fractions of the broken firebrick. The disclosed gas turbine electric power generating system described above employs a fuel reforming apparatus of indirect heat exchange type.

SUMMARY OF THE INVENTION

The present invention has been come up from solving the above problems, and the object of the present invention is to provide a highly reliable fuel reforming apparatus which can be applied to a gas turbine electric power generating system having a large load fluctuation. At the same time, the object of the present invention is to provide a highly reliable electric power generating system with the fuel reforming apparatus.

In order to obtain a fuel reforming apparatus capable of attaining the above object, according to the present invention, a fuel reforming apparatus is constructed as follows.

A fuel reforming apparatus comprises a first chamber having a reforming catalyst bed inside, and a second chamber for introducing a cooling medium into the first chamber, and the second chamber is arranged adjacent to the first chamber.

A fuel reforming apparatus comprises a first chamber for obtaining a gas to be reformed by partially oxidizing a raw fuel and for obtaining a reformed gas by reforming the gas to be reformed using a reforming catalyst bed installed inside, and a second chamber for introducing a cooling medium into the first chamber, and the second chamber is arranged adjacent to the first chamber.

A fuel reforming apparatus comprises a fuel flow passage for obtaining a gas to be reformed by partially oxidizing a raw fuel and for obtaining a reformed gas by reforming the gas to be reformed using a reforming catalyst bed installed inside, and a cooling jacket for introducing a cooling medium into the fuel flow passage through several positions, and the cooling jacket is arranged adjacent to the fuel flow passage in the upstream of the reforming catalyst bed.

A fuel reforming apparatus comprises a fuel flow passage for obtaining a gas to be reformed by partially oxidizing a raw fuel and for obtaining a reformed gas by reforming the gas to be reformed using a reforming catalyst bed installed inside, a cooling jacket for introducing a cooling medium into the fuel flow passage through several positions, the cooling jacket being arranged adjacent to the fuel flow passage in the upstream of the reforming catalyst bed, and a flow straightener provided in the upstream of the reforming catalyst bed.

The flow straightener described above holds a combustion catalyst.

A fuel reforming apparatus comprises a fuel flow passage for obtaining a gas to be reformed by partially oxidizing a raw fuel and for obtaining a reformed gas by reforming the gas to be reformed using a reforming catalyst bed installed inside, and a cooling jacket for introducing a cooling medium into the fuel flow passage through several positions, and the cooling jacket is arranged adjacent to the fuel flow passage in the upstream of the reforming catalyst bed, and the fuel flow passage being composed of a plurality of fuel flow passages having different diameters.

A fuel reforming apparatus comprises a first chamber for obtaining a gas to be reformed by partially oxidizing a raw fuel and for obtaining a reformed gas by reforming the gas to be reformed using a reforming catalyst bed installed inside, a second chamber for introducing a first medium for cooling the first chamber into the first chamber, the second chamber being arranged adjacent to the first chamber, and swirling means for giving a swirl to a second medium supplied to the first chamber, the swirling means being provided in the upstream of the reforming catalyst bed.

In order to obtain an electric power generating system capable of attaining the object described above, according to the present invention, an electric power generating system is constructed as follows.

An electric power generating system comprises a burner for obtaining a burned gas by burning a fuel, a turbine driven with the burned gas obtained in the burner, and an exhaust heat recovery boiler for generating steam using the exhaust gas exhausted from the turbine, which system further comprises a fuel reforming apparatus being cooled with the steam obtained from the exhaust heat recovery boiler and obtaining the fuel supplied to the burner.

An electric power generating system comprises a burner for obtaining a burned gas by burning a fuel, a turbine driven with the burned gas obtained in the burner, and an exhaust heat recovery boiler for generating steam using the exhaust gas exhausted from the turbine, which system further comprises a fuel reforming apparatus, being cooled with the steam obtained from the exhaust heat recovery boiler, adjusting the temperature of a gas to be reformed with the cooling steam, and obtaining the fuel supplied to the burner.

An electric power generating system comprises a burner for obtaining a burned gas by burning a fuel with compressed air, a turbine driven with the burned gas obtained in the burner, and an exhaust heat recovery boiler for generating steam using the exhaust gas exhausted from the turbine, which system further comprises a fuel reforming apparatus being cooled with the compressed air and the steam obtained from the exhaust heat recovery boiler, adjusting the temperature of a gas to be reformed with the cooling steam, and obtaining the fuel supplied to the burner.

According to the fuel reforming apparatus of the present invention described above, the fuel flow passage is cooled from the outside by introducing a cooling medium of steam into a second chamber of a cooling jacket arranged adjacent to the first chamber of the fuel flow passage. By doing so, the fuel flow passage exposed to a high temperature reformed gas can be protected from the high temperature reformed gas.

The steam after cooling the cooling jacket is introduced into the fuel flow passage through several positions of the cooling jacket. By doing so, the temperature of the reformed gas flowing into the reforming catalyst bed is adjusted to a temperature suitable for reforming in the reforming catalyst bed.

According to a fuel reforming apparatus of the present invention, the reformed gas is introduced into a reforming catalyst bed through a flow straightener provided in the upstream of the reforming catalyst bed. By doing so, the velocity distribution domain, the temperature distribution domain and the fuel concentration domain formed in the reformed gas become uniform to the direction of gas flow. Further, since combustion catalyst is held to the flow straightener, a small amount of the oxygen in air contained in the reformed gas is completely burned.

According to a fuel reforming apparatus of the present invention, since the fuel flow passage is composed of a plurality of fuel flow passages having different diameters, the thermal stress acting on the fuel flow passage due to expansion and contraction differences can be small enough to be allowed.

According to a fuel reforming apparatus of the present invention, cooling medium of air is introduced into the cooling jacket to cool the fuel flow passage from the outside. Further, steam is supplied to the fuel flow passage through a swirl means. The supplied steam widely expands inside the fuel flow passage to cool the fuel flow passage from the inside. By doing so, the fuel flow passage exposed to a high temperature reformed gas can be protected from the high temperature reformed gas. The steam is mixed with the reformed gas. Therefore, the temperature of the reformed gas flowing into the reforming catalyst bed is adjusted to a temperature suitable for reforming in the reforming catalyst bed.

According to the electric power generating system described above, the fuel reforming apparatus is cooled by the steam generated in the exhaust heat recovering boiler or the compressed air. By doing so, even if fluctuation in the thermal load occurs due to the load fluctuation of the gas turbine, fuel gas to be supplied to the burner can be obtained while the fuel reforming apparatus is being protected against the heat.

DESCRIPTION OF EMBODIMENTS

The present invention will be described in detail below, referring to the accompanying drawings.

Figure 1:
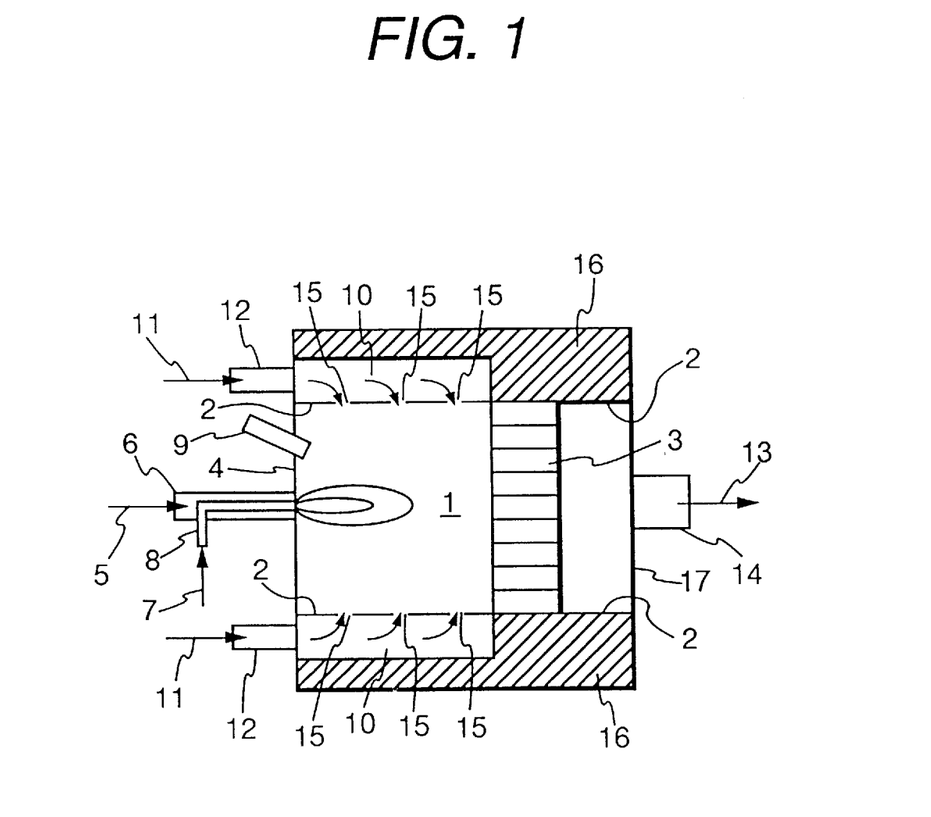
FIG. 1 is a cross-sectional view of a first embodiment of a fuel reforming apparatus in accordance with the present invention being taken on the plane including the axial line of the fuel reforming apparatus.

FIG. 1 is a cross-sectional view of a first embodiment of a fuel reforming apparatus in accordance with the present invention being taken on the plane including the axial line of the fuel reforming apparatus.

A cylindrical fuel reforming apparatus covered with a thermal insulating layer 16 comprises a fuel flow passage 1 contoured by a cylindrical contour wall 2 in its central axial direction and a reforming catalyst bed 3 in the middle of the flow passage for reforming gas to be reformed flowing from the upstream of the fuel flow passage 1 into a proper reformed gas. The thermal insulating layer 16 has a role for shielding heat radiated from the fuel reforming apparatus, and is constructed with a heat insulator made of glass wool or ceramic wool having a small thermal conductivity. The reforming catalyst bed 3 is made of a nickel alloy having a better reforming characteristic to hydrocarbon and being low in cost.

Wherein, the word "contour" means to determine a contour or a shape of a substance, and the words "contour wall" mean a wall to determine a contour or a shape of a substance.

A cooling jacket 10 is arranged in the upstream of the reforming catalyst bed 3 so as to surround the fuel flow passage 1 and to be supplied with steam 11 for cooling the cylindrical contour wall 2. There are provided in the cylindrical contour wall 2 in the upstream of the reforming catalyst bed 3 a plurality of injection nozzles 15 communicating the cooling jacket 10 with the fuel flow passage 1 so that the steam 11 introduced into the cooling jacket 10 is allowed to flow into the fuel flow passage 1.

A fuel supply pipe 6, through which a mixed gas 5 obtained by mixing a fuel such as hydrocarbon with steam in a proper ratio is supplied to the fuel flow passage 1 from the outside, is connected nearly to the central portion of an end surface 4 in the upstream side of the fuel reforming apparatus, and an air supply pipe 8 for supplying air 7 from the outside into the fuel flow passage 1 is arranged inside the fuel supply pipe 6 nearly on its center axis. In the end surface 4 in the upstream side, a plurality of cooling medium supply pipes 12 for supplying the steam 11 from the outside into the cooling jacket 10 are connected to the peripheral direction of the fuel reforming apparatus along the cooling jacket 10. The reference character 9 is a spark plug for igniting the gas supplied into the fuel flow passage 1.

A fuel outlet pipe 14 for exhausting hydrogen enriched gas 13 obtained by being reformed with the reforming catalyst bed 3 is connected to nearly the central portion of the end surface 17 in the down stream side of the fuel reforming apparatus.

The fuel reforming apparatus according to the present invention is constructed as described above, and operates as follows.

A mixing gas 5 mixed a fuel such as hydrocarbon (methane in this embodiment) and steam in a proper ratio is supplied to the fuel flow passage 1 through the fuel supply pipe 6, and air 7 is supplied to the fuel flow passage 1 through the air supply pipe 8. The mixed gas 5 and the air supplied to the fuel flow passage 1 are ignited with the spark plug 9 to be burned diffusely. Therein, since the flow rate of the air 7 supplied to the fuel flow passage 1 through the air supply pipe 8 is as much as an amount to burn approximately 20% of the supplied mixed gas 5 (the fuel of methane), the mixed gas is partially oxidized (partial combustion) and a high temperature gas containing unburned gas to be reformed can be obtained.

Although the mixed gas 5 supplied to the fuel flow passage 1 through the fuel supply pipe 6 is obtained by mixing the fuel such as hydrocarbon and the steam in a proper ratio in advance, the timing of the mixing may be at the time before supplying to the fuel supply pipe 6, or the fuel such as hydrocarbon and the steam may be separately supplied to the fuel supply pipe 6.

On the other hand, steam 11 is supplied into the cooling jacket 10 through the cooling medium supply pipe 12. The steam 11 supplied to the cooling jacket 10 cools the cylindrical contour wall 2 exposed to the high temperature gas to be reformed obtained through the combustion described above from the outside of the cylindrical contour wall.

The steam 11 supplied to the cooling jacket 10 after cooling the cylindrical contour wall 2 is injected into the fuel flow passage 1 through the plurality of injecting nozzles 15 communicating between the cooling jacket 10 and the fuel flow passage 1 to be mixed with the high temperature gas to be reformed obtained through the combustion. By doing so, the temperature of the high temperature gas to be reformed is adjusted to a temperature suitable for flowing into the reforming catalyst bed 3, that is, a temperature suitable for reforming, and the high temperature gas to be reformed is allowed to flow into the reforming bed 3.

In the reforming catalyst bed 3, a chemical reaction expressed by the following equation occurs to reform the gas to be reformed to a hydrogen enriched gas 13. This reforming reaction is called as steam reforming reaction of methane which is an endothermic chemical reaction to change a mixed gas of methane and steam into a hydrogen enriched gas.

$$CH_4 + sH_2O \rightarrow hH_2 + c_1CO + c_2CO_2 - \Delta Q \qquad (1)$$

where, s, h, $c_1$, $c_2$ are constants and $\Delta Q$ is reaction heat.

The hydrogen enriched gas 13 obtained in such a manner is supplied to an external apparatus through the fuel outlet pipe 14.

According to the embodiment, since the cooling jacket 10 is provided so as to surround the fuel flow passage 1 formed by the cylindrical contour wall 2 and be supplied into the cooling jacket 10 with the steam 11 for cooling the cylindrical contour wall 2, the cylindrical contour wall 2 is cooled with the steam 11 from the outside. Therefore, the cylindrical contour wall 2 heated to a high temperature by the high temperature gas to be reformed can be protected by the cooling. By doing so, the reliability against high temperature of the fuel reforming apparatus can be improved. In more detail, the cylindrical contour wall 2 directly exposed to the gas to be reformed obtained through the partial oxidization (combustion) is heated up to nearly 1100° C. On the other hand, the cooling jacket 10 is supplied with the steam of 350° C. to 450° C. By this manner, the temperature of the cylindrical contour wall 2 directly expose to the high temperature gas to be reformed can be suppressed to nearly 700° C. Therefore, the cylindrical contour wall 2 may be formed of a material capable of withstanding against a temperature around 700° C.

According to the embodiment, since the plurality of injecting nozzles 15 communicating the cooling jacket 10 with the fuel flow passage 1 are provided in the cylindrical contour wall 2 and the steam 11 after cooling the cylindrical contour wall 2 is injected into the fuel flow passage 1 through the plurality of injecting nozzles 15, the temperature of the gas to be reformed has a freedom to be adjusted by the air 7 partially oxidizing (partially burning) the mixed gas 5 and the steam 11 after cooling the cylindrical contour wall 2. By doing so, even if activity change (for example, activity degradation) occurs in the reforming catalyst, the reforming rate in the reforming catalyst bed 3 can be kept constant by adjusting the temperature of the gas to be reformed using the air 7 and the steam 11. Therefore, the controllability of the fuel reforming apparatus can be matched with the performance of the fuel reforming apparatus.

Since it is possible to set the steam-carbon ratio s ($H_2O/CH_4$ molecular ratio) in the reforming reaction in the reforming catalyst bed 3, that is, the reaction expressed by the aforementioned equation to 4.0 by mixing the steam 11 after cooling the cylindrical contour wall 2 with the gas to be reformed, the reaction expressed by the equation (1) described above can be promoted. Therefore, the efficiency of the reforming in the reforming catalyst bed 3 can be improved.

According to the embodiment, since diffuse combustion is employed as the combustion method, the mixed gas 5 supplied through the fuel supply pipe 6 and the air 7 supplied through the air supply pipe 8 are certainly ignited. That is, when the mixed gas 5 (fuel) and the air are separately supplied, the concentration distribution of the fuel is widely distributed in the range from 0% (100% air) to 100% (0% air). On the other hand, each kind of fuels has each proper combustion range, that is, each fuel concentration range to maintain burning (for example, the combustion range of methane of fuel in this embodiment in air (under condition of room temperature and normal pressure) is 5.0% to 15.0% in volume concentration unit. Therefore, by employing diffuse combustion, the range of the mixed fuel is certainly within the combustion range and can be certainly ignited. Therefore, the reliability for combustion in the fuel flow passage 1 of the fuel reforming apparatus can be improved.

Figure 2:
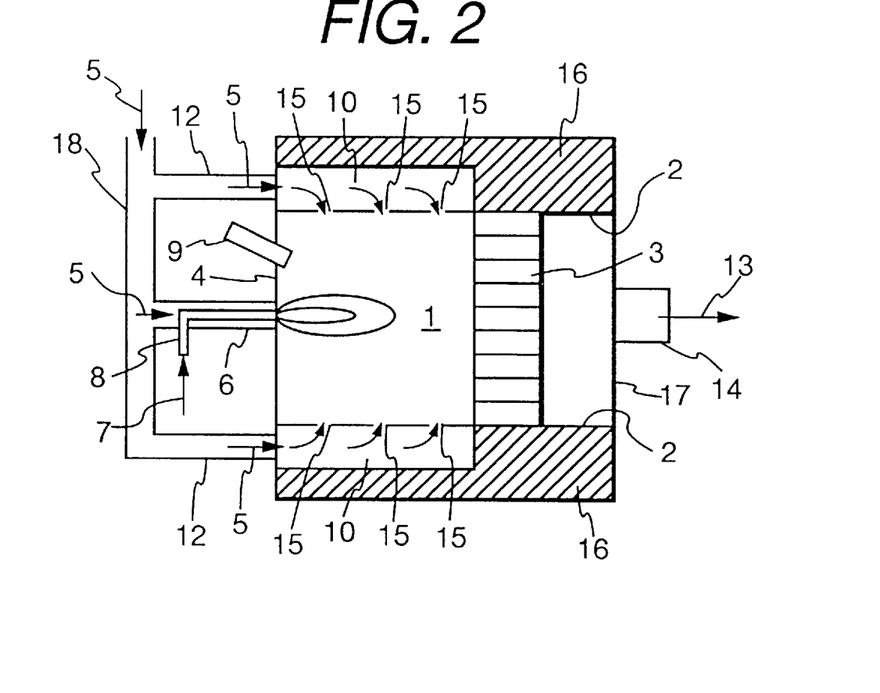
FIG. 2 is a cross-sectional view of a second embodiment of a fuel reforming apparatus in accordance with the present invention being taken on the plane including the axial line of the fuel reforming apparatus.

FIG. 2 is a cross-sectional view of a second embodiment of a fuel reforming apparatus in accordance with the present invention being taken on the plane including the axial line of the fuel reforming apparatus which is a modification of the apparatus shown in FIG. 1. Accordingly, only different points from those of FIG. 1 will be described below.

In this embodiment, the mixed gas 5 formed by mixing fuel such as hydrocarbon and steam in a proper ratio, that is, a gas having the same composition as the mixed gas 5 supplied into the fuel flow passage 1 through the fuel supply pipe 6 is used as the cooling medium introduced into the cooling jacket 10.

Therefore, in the fuel reforming apparatus of this embodiment, a fuel supply pipe 6 and a plurality of cooling medium supply pipes 12 connecting to the end surface 4 in the upstream side are connected to a main fuel pipe 18 in the upstream. Since the other portions are the same as those of FIG. 1, description on the other portions will be omitted here.

By constructing as described above, a mixing gas 5 mixed a fuel such as hydrocarbon (methane in this embodiment) and steam in a proper ratio is supplied to the fuel flow passage 1 through the main fuel pipe 18 and the fuel supply pipe 6, and air 7 is supplied to the fuel flow passage 1 through the air supply pipe 8. The mixed gas 5 and the air supplied to the fuel flow passage 1 are ignited with the spark plug 9 to be burned diffusely. Therein, since the flow rate of the air 7 supplied to the fuel flow passage 1 through the air supply pipe 8 is as much as an amount to burn approximately 20% of the supplied mixed gas 5 (the fuel of methane), the mixed gas is partially oxidized (partial combustion) and a high temperature gas containing unburned gas to be reformed can be obtained.

On the other hand, the mixed gas 5 is supplied into the cooling jacket 10 through the main fuel pipe 18 and the cooling medium supply pipe 12. The mixed gas 5 supplied to the cooling jacket 10 cools the cylindrical contour wall 2 exposed to the high temperature gas to be reformed obtained through the combustion described above from the outside of the cylindrical contour wall 2.

Although the mixed gas 5 supplied to the fuel flow passage 1 through the main fuel pipe 18 and the fuel supply pipe 6 and the mixed gas 5 supplied into the cooling jacket 10 through the cooling medium supply pipe 12 are obtained by mixing the fuel such as hydrocarbon and the steam in a proper ratio in advance, the timing of the mixing may be at the time before supplying to the main fuel pipe 18, or the fuel such as hydrocarbon and the steam may be separately supplied to the main fuel pipe 18.

The mixed gas 5 supplied to the cooling jacket 10 after cooling the cylindrical contour wall 2 is injected into the fuel flow passage 1 through the plurality of injecting nozzles 15 communicating between the cooling jacket 10 and the fuel flow passage 1 to be mixed with the high temperature gas to be reformed obtained through the combustion. By doing so, the temperature of the high temperature gas to be reformed is adjusted to a temperature suitable for flowing into the reforming catalyst bed 3, that is, a temperature suitable for reforming. Then the high temperature gas to be reformed is allowed to flow into the reforming bed 3 to be reformed according to the reaction expressed by the equation (1).

According to the embodiment, since the fuel supply pipe 6 and the cooling medium supply pipe 12 are connected to the main fuel pipe 18 of common pipe to them and the mixed gas 5 is supplied into the cooling jacket 10, the cylindrical contour wall 2 is cooled with the steam 11 from the outside. Therefore, the cylindrical contour wall 2 heated to a high temperature by the high temperature gas to be reformed can be protected by the cooling. By doing so, the reliability against high temperature of the fuel reforming apparatus can be improved.

Since the mixed gas 5 is supplied to the cooling jacket 10, the fuel concentration in the mixed gas 5 conducted to the fuel flow passage 1 through fuel supply pipe 6 is more dilute than the fuel concentration in the mixed gas 5 conducted to the fuel flow passage through the fuel supply pipe 6 in the precedent embodiment. That is, assuming that the fuel flow rate and the steam flow rate conducted to the fuel reforming apparatus in the precedent embodiment are set to the same flow rates as those conducted to the fuel reforming apparatus in this embodiment, all of the fuel supplied from the fuel supply pipe 6 is conducted to the fuel reforming apparatus in the fuel reforming apparatus in the precedent embodiment. In other words, the fuel is not conducted to the cooling jacket 10. On the other hand, since a part of the fuel is conducted to the cooling jacket 10 in this embodiment, the fuel entering into the fuel flow passage 1 through the fuel supply pipe 6 becomes less (more dilute).

Consequently, a local high temperature region is hardly formed in the high temperature gas to be reformed containing unburned gas formed in the fuel flow passage 1, and accordingly the cylindrical contour wall 2 is protected form the high temperature gas to be reformed. Thereby, the reliability to high temperature of the fuel reforming apparatus can be further improved.

Further, according to the present invention, since the plurality of injecting nozzles 15 communicating the cooling jacket 10 with the fuel flow passage 1 are provided in the cylindrical contour wall 2 and the mixed gas 5 supplied to the cooling jacket 10 is injected into the fuel flow passage 1 through the plurality of injecting nozzles 15, the gas to be reformed and the mixed gas 5 are mixed with each other. Therefore, the uniformity of mixing between the fuel and the steam in the gas to be reformed entering into the reforming catalyst bed 3 is improved, and accordingly a uniform reaction can be performed in the reforming catalyst bed 3. Thereby, the performance of the fuel reforming apparatus can be improved.

Figure 3:
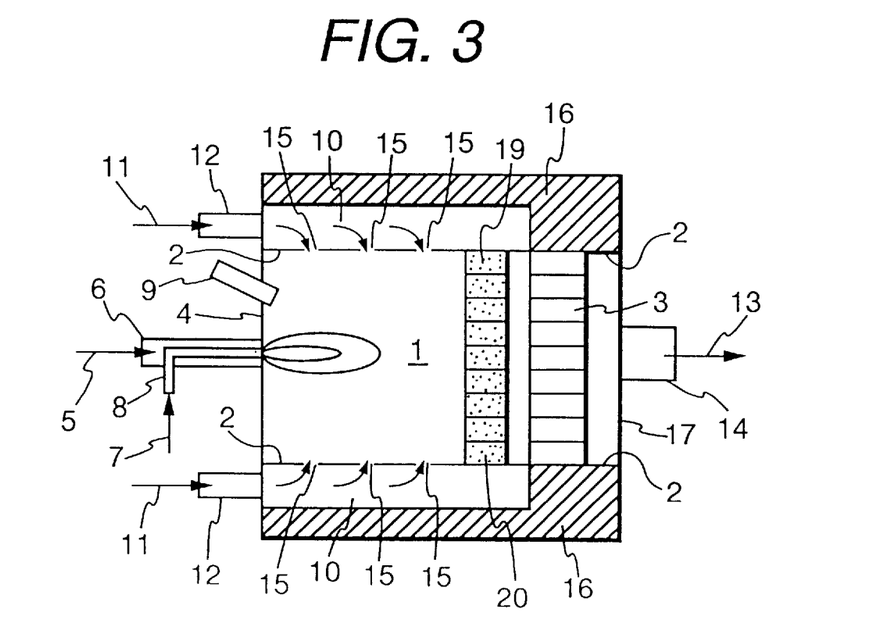
FIG. 3 is a cross-sectional view of a third embodiment of a fuel reforming apparatus in accordance with the present invention being taken on the plane including the axial line of the fuel reforming apparatus.

FIG. 3 is a cross-sectional view of a third embodiment of a fuel reforming apparatus in accordance with the present invention being taken on the plane including the axial line of the fuel reforming apparatus which is a modification of the apparatus shown in FIG. 1. Accordingly, only different points from those of FIG. 1 will be described below.

In this embodiment, a flow straightener 19 formed with a plurality of vanes in a honeycomb shape is provided in the upstream of the reforming catalyst bed 3 contained inside the fuel flow passage 1. In the fuel flow passage 1, each of the velocity distribution domain, the temperature distribution domain and the fuel distribution domain is formed in the high temperature gas to be reformed which contains unburned gas obtained by partial oxidization (partial combustion) of the mixed gas 5 and the air 7. Therefore, if the gas to be reformed in such a state enters into the reforming catalyst bed 3, uniform reforming reaction cannot be obtained, which leads to a non-uniform temperature distribution and a non-uniform reaction distribution. In this embodiment, the flow straightener 19 is provided in the upstream of the reforming catalyst 3 in order to prevent this phenomenon.

By constructing in such a manner, the high temperature gas to be reformed containing unburned gas obtained by combustion is adjusted to a proper temperature suitable for entering the reforming catalyst bed 3 (temperature suitable for reforming) by the steam 11 of cooling medium injected through the plurality of injecting nozzles 15 (the mixed gas 5 supplied into the fuel flow passage 1 through the fuel supply pipe 6 may be used instead) and is allowed to flow into the downstream side. Therein, since the gas to be reformed passes through the flow straightener 19, the velocity distribution domain, the temperature distribution domain and the fuel distribution domain formed in the gas to be reformed are made uniform to the direction of the gas flow and the gas to be reformed is allowed to flow into the reforming catalyst bed 3.

According to this embodiment, since the flow straightener 19 formed with a plurality of vanes in a honeycomb shape is provided in the upstream of the reforming catalyst bed 3 contained inside the fuel flow passage 1 and the gas to be reformed obtained by combustion is passed through the flow straightener 19 before entering the reforming catalyst bed 3, the velocity distribution domain, the temperature distribution domain and the fuel distribution domain formed in the gas to be reformed are made uniform to the direction of the gas flow. Accordingly, the heat load due to the reaction per unit volume of the reforming catalyst bed 3 is made uniform and consequently the life time of the reforming catalyst bed 3 can be extended. Thereby, the reliability of the reforming apparatus can be improved.

A further improvement described below is added to this embodiment.

The flow straightener 19 holds combustion catalyst 20. In more detail, the flow straightener 19 holds the combustion catalyst 20 having an active component such as palladium, platinum or the like. In this case, it is preferable that the flow straightener 19 is made of a high heat resistant material of ceramic such as lanthanum-β-alumina.

In the high temperature gas to be reformed containing unburned gas obtained by partial oxidization, a small amount of oxygen in air remains. If the gas to be reformed in this state enters into the reforming catalyst bed 3, the reforming catalyst is oxidized by the remaining oxygen in air and consequently reforming reaction cannot be performed sufficiently. In order to prevent this, according to this embodiment, the flow straightener 19 holds the combustion catalyst 20 having an active component such as palladium, platinum or the like.

Furthermore, in order that the flow straightener 19 withstand against the combustion temperature by the combustion catalyst 20, the flow straightener 19 is made of a high temperature resistant material of ceramic such as lanthanum-β-alumina or the like.

By constructing in such a manner, the high temperature gas to be reformed containing unburned gas obtained by combustion is adjusted to a proper temperature suitable for entering the reforming catalyst bed 3 (temperature suitable for reforming) by the steam of cooling medium injected through the plurality of injecting nozzles 15 (the mixed gas 5 supplied into the fuel flow passage 1 through the fuel supply pipe 6 may be used instead) and is allowed to flow into the downstream side. Therein, since the gas to be reformed passes through the flow straightener 19, the velocity distribution domain, the temperature distribution domain and the fuel distribution domain formed in the gas to be reformed are made uniform to the direction of the gas flow and the gas to be reformed is allowed to flow into the reforming catalyst bed 3.

According to this embodiment, since the flow straightener 19 holds the combustion catalyst 20 having an active component such as palladium, platinum or the like and the gas to be reformed is passed through the flow straightener 19 before entering the reforming catalyst bed 3, the small amount of oxygen in air remaining in the gas to be reformed after the partial oxidization is completely burned. Thereby, the oxidization of the reforming catalyst bed 3 by the small amount of oxygen in air remaining in the gas to be reformed can be prevented and the reforming reaction can be performed sufficiently.

Since the flow straightener 19 is made of a high temperature resistant material of ceramic such as lanthanum-β-alumina or the like in order that the flow straightener 19 withstand against the combustion temperature by the combustion catalyst 20, the flow straightener 19 can be prevented from deformation due to high temperature. therefore, the performance and the reliability of the reforming apparatus can be improved.

Figure 4:
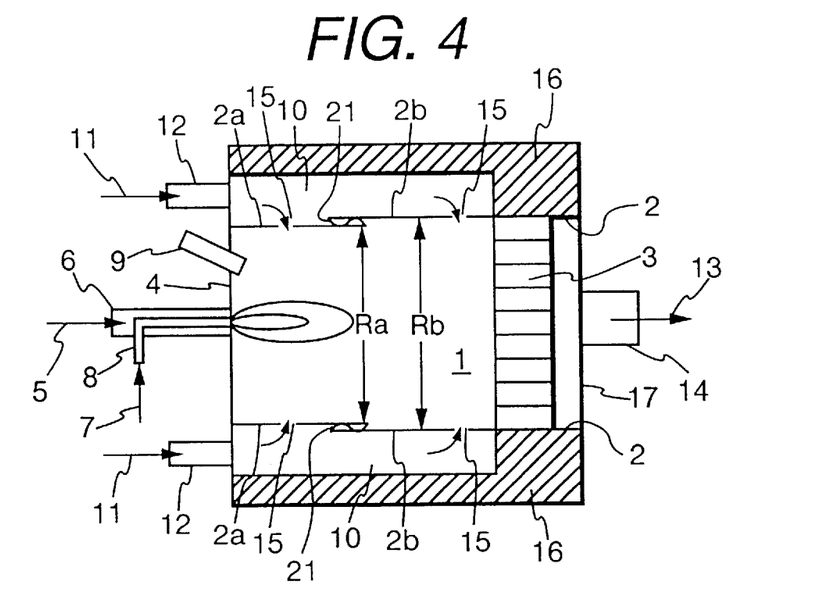
FIG. 4 is a cross-sectional view of a fourth embodiment of a fuel reforming apparatus in accordance with the present invention being taken on the plane including the axial line of the fuel reforming apparatus.

FIG. 4 is a cross-sectional view of a fourth embodiment of a fuel reforming apparatus in accordance with the present invention being taken on the plane including the axial line of the fuel reforming apparatus which is a modification of the apparatus shown in FIG. 1. Accordingly, only different points from those of FIG. 1 will be described below.

In this embodiment, the fuel flow passage 1 is composed of a first cylindrical contour wall 2a and a second cylindrical contour wall 2b having different diameters from each other. In more detail, the diameter Ra of the first cylindrical contour wall 2a is smaller than the diameter Rb of the second cylindrical contour wall 2b, and the end portions of the cylindrical contour walls having different diameters from each other are slipped over to couple together. Since a gap is formed in the slipped portion of the cylindrical contour walls having different diameters, a ring-shaped flare-seal 21 having S-shaped cross section is provided in the gap portion to elastically support the two cylindrical contour walls having different diameters.

As for the diameters, Ra is 350 mm, Rb is 370 mm and the gap is nearly 10 mm.

The flare-seal 21 is commonly called as a spring seal the line contact in the peripheral direction of which prevents fluid from leaking through a gap formed when two cylindrical contour walls having different diameters are slipped over to couple together. The flare-seal 21 has slit-shaped cuts in the axial direction to provide the seal with elasticity.

Since the cylindrical contour wall 2 is cooled from the outside by the steam 11 supplied to the cooling jacket 10 (the mixed gas 5 supplied into the fuel flow passage 1 through the fuel supply pipe 6 may be used instead) and heated for the inside by the high temperature gas to be reformed, both of expansion stress and contraction stress act on the cylindrical contour wall 2. In the fuel reforming apparatuses described in FIG. 1 to FIG. 3, when the difference between the expansion and the contraction stresses is too large, the stresses give a bad influence to the other components composing the apparatus or damage the cylindrical contour wall itself because the cylindrical contour wall 2 has a small permissibility. In this embodiment, the fuel flow passage 1 is composed of the first cylindrical contour wall 2a and the second cylindrical contour wall 2b having different diameters from each other to give the cylindrical contour wall permissibility against the expansion and contraction difference.

According to this embodiment, since the fuel flow passage 1 is composed of the first cylindrical contour wall 2a and the second cylindrical contour wall 2b having different diameters from each other, the expansion and contraction difference due to thermal stress acting on the cylindrical contour wall 2 is permissible. Thereby, the stress does not give a bad influence to the other components composing the apparatus and degradation in strength of the cylindrical contour wall itself can be prevented, which improves the life time of the apparatus. Accordingly, the reliability of the fuel reforming apparatus against heat can be improved.

Figure 5:
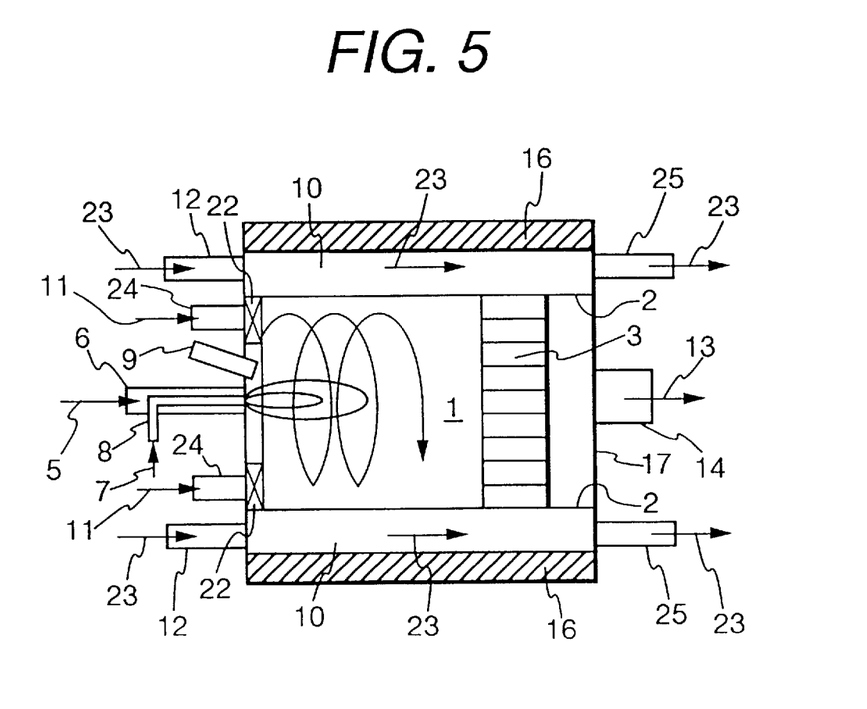
FIG. 5 is a cross-sectional view of a fifth embodiment of a fuel reforming apparatus in accordance with the present invention being taken on the plane including the axial line of the fuel reforming apparatus.

FIG. 5 is a cross-sectional view of a fifth embodiment of a fuel reforming apparatus in accordance with the present invention being taken on the plane including the axial line of the fuel reforming apparatus.

A cylindrical fuel reforming apparatus covered with a thermal insulating layer 16 comprises a fuel flow passage 1 contoured by a cylindrical contour wall 2 in its central axial direction and a reforming catalyst bed 3 in the middle of the flow passage for reforming gas to be reformed flowing from the upstream of the fuel flow passage 1 into a proper reformed gas. A cooling jacket 10 is arranged around the fuel flow passage 1 so as to surround the fuel flow passage 1 and to be supplied with air 23 for cooling the cylindrical contour wall 2.

The thermal insulating layer 16 has a role for shielding heat radiated from the fuel reforming apparatus, and is constructed with a heat insulator made of glass wool or ceramic wool having a small thermal conductivity. The reforming catalyst bed 3 is made of a nickel alloy having a better reforming characteristic to hydrocarbon and being low in cost.

A fuel supply pipe 6, through which a mixed gas 5 obtained by mixing a fuel such as hydrocarbon with steam in a proper ratio is supplied to the fuel flow passage 1 from the outside, is connected nearly to the central portion of an end surface 4 in the upstream side of the fuel reforming apparatus, and an air supply pipe 8 for supplying air 7 from the outside into the fuel flow passage 1 is arranged inside the fuel supply pipe 6 nearly on its center axis. A plurality of steam supply pipes 24 for supplying the steam 11 from the outside into the fuel flow passage 1 arranged around the fuel supplying pipe 6, and a plurality of cooling medium supply pipes 12 for supplying air 23 from the outside into the cooling jacket 10 cooling jacket 10 arranged in the peripheral direction of the fuel reforming apparatus along the cooling jacket 10 are connected to the end surface 4 in the upstream side. The reference character 9 is a spark plug for igniting the gas supplied into the fuel flow passage 1.

A fuel outlet pipe 14 for exhausting hydrogen enriched gas 13 obtained by being reformed with the reforming catalyst bed 3 is connected to nearly the central portion of the end surface 17 in the down stream side of the fuel reforming apparatus. A cooling medium outlet pipe 25 for supplying the air 23 introduced into the cooling jacket 10 to the outside arranged in the peripheral direction of the fuel reforming apparatus along the cooling jacket 10 is connected to the end surface 17 in the downstream side.

In order to give swirl to the steam 11 supplied in the fuel flow passage 1 through the plurality of steam supply pipes 24, a swirl device 22 arranged so as to surround circularly the fuel supply pipe 6 is provided in the upstream side of the reforming catalyst bed 3, that is, the end portion of the fuel flow passage 1 (the end surface 4 in the upstream side).

The fuel reforming apparatus according to the present invention is constructed as described above, and operates as follows.

A mixing gas 5 mixed a fuel such as hydrocarbon (methane in this embodiment) and steam in a proper ratio is supplied to the fuel flow passage 1 through the fuel supply pipe 6, and air 7 is supplied to the fuel flow passage 1 through the air supply pipe 8. The mixed gas 5 and the air supplied to the fuel flow passage 1 are ignited with the spark plug 9 to be burned diffusely. Therein, since the flow rate of the air 7 supplied to the fuel flow passage 1 through the air supply pipe 8 is as much as an amount to burn approximately 20% of the supplied mixed gas 5 (the fuel of methane), the mixed gas is partially oxidized (partial combustion) and a high temperature gas containing unburned gas to be reformed can be obtained. In this embodiment, the diffuse combustion having a wide stable combustion range is employed as the combustion method.

Although the mixed gas 5 supplied to the fuel flow passage 1 through the fuel supply pipe 6 is obtained by mixing the fuel such as hydrocarbon and the steam in a proper ratio in advance, the timing of the mixing may be at the time before supplying to the fuel supply pipe 6, or the fuel such as hydrocarbon and the steam may be separately supplied to the fuel supply pipe 6.

Steam 23 is supplied to the fuel flow passage 1 through the steam supply pipe 24. At this time, a swirl is given to the steam 23 by the swirl device 22 provided in the upstream side of the reforming catalyst bed 3, that is, the end portion of the fuel flow passage 1 (the end surface 4 in the upstream side), the steam is expanded widely. The steam 23 expanded widely cools the cylindrical contour wall 2 exposed to the high temperature gas to be reformed from the inside, and at the same time mixes with the high temperature gas to be reformed containing unburned gas obtained by the combustion to adjust the high temperature gas to be reformed containing unburned gas to a temperature suitable for entering the reforming catalyst bed 3, that is, a temperature suitable for the reforming.

On the other hand, steam 11 is supplied into the cooling jacket 10 through the cooling medium supply pipe 12. The steam 11 supplied to the cooling jacket 10 cools the cylindrical contour wall 2 exposed to the high temperature gas to be reformed obtained through the combustion described above from the outside of the cylindrical contour wall. The air 23 supplied into the cooling jacket 10 after cooling is supplied to the outside through the cooling medium outlet pipe 25.

The gas to be reformed adjusted to a temperature suitable for entering the reforming catalyst bed 3, that is, a temperature suitable for the reforming is reformed to a hydrogen enriched gas 13 by the reforming catalyst bed 3 and then supplied to an external apparatus through the fuel outlet pipe 14. The reforming reaction in the reforming catalyst bed 3 is performed through the same process expressed by the equation (1) described above.

According to the embodiment, since the cooling jacket 10 is arranged so as to surround the fuel flow passage 1 and air 23 is supplied into the cooling jacket 10, the cylindrical contour wall 2 is cooled by the air 23 supplied to the cooling jacket 10 from the outside.

Since the swirl device 22 is provided in the upstream side of the reforming catalyst bed 3, that is, the end portion of the fuel flow passage 1 (the end surface 4 in the upstream side) and a swirl is given to the steam 11 supplied into the fuel flow passage 1 through the steam supply pipe 24 to expand the steam 11 inside the fuel flow passage 1 widely, the cylindrical contour wall 2 is cooled by the steam 11 form the inside. By doing so, the cylindrical contour wall 2 exposed to the high temperature gas to be reformed obtained by the combustion is protected by being cooled both from the inside and from the outside. Therefore, the reliability of the reforming apparatus to high temperature is improved.

An embodiment of an electric power generating system having the aforementioned fuel reforming apparatus will be described below.

Figure 6:
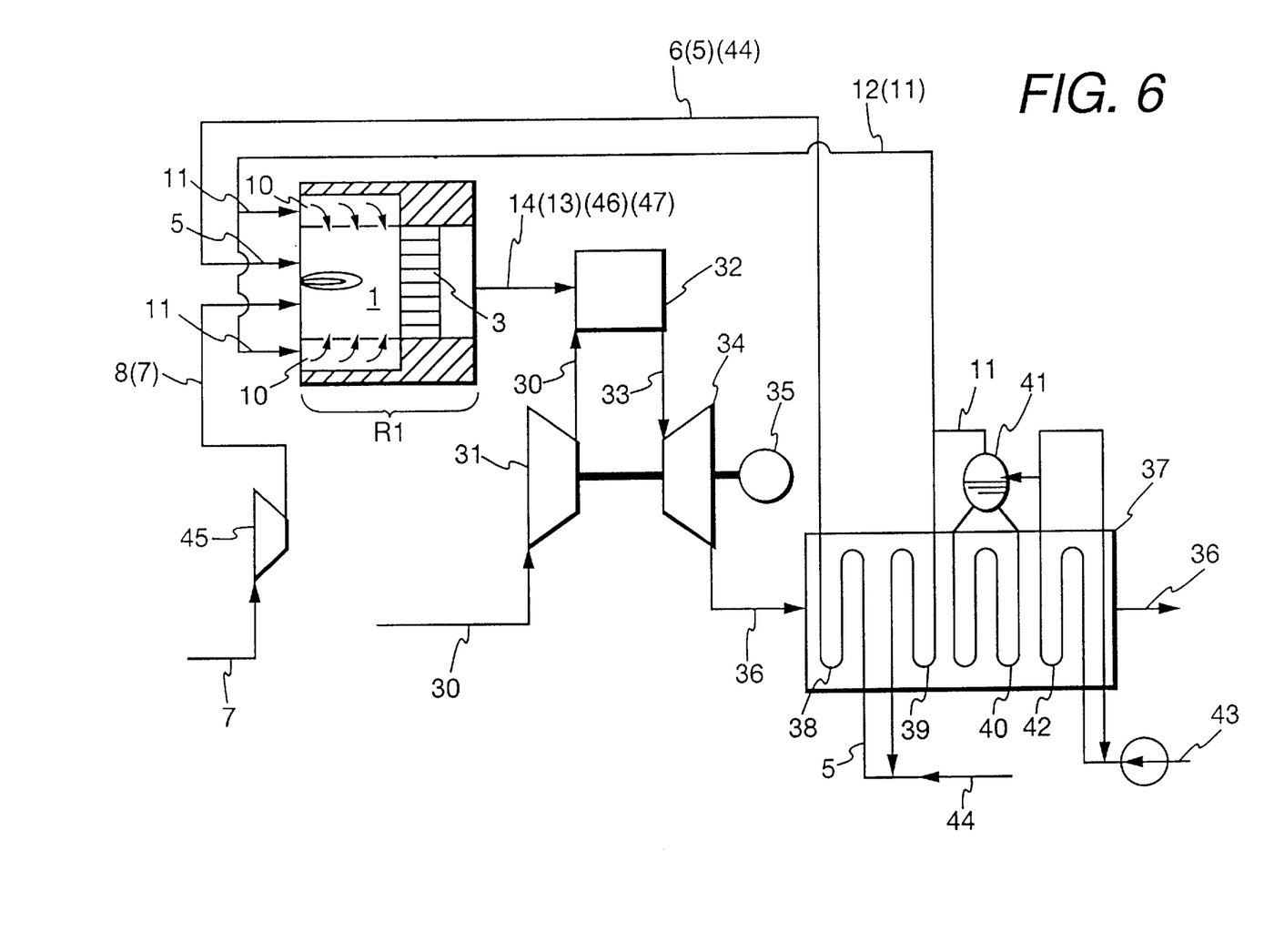
FIG. 6 is a system diagram showing a sixth embodiment of an electric power generating plant having the fuel reforming apparatus of FIG. 1 in accordance with the present invention.

FIG. 6 is a system diagram showing a sixth embodiment of an electric power generating plant having the fuel reforming apparatus of FIG. 1 in accordance with the present invention. This embodiment of the electric power generating system can be roughly classified into a gas turbine system, an exhaust heat recovering system and a fuel reforming system.

The gas turbine system comprises a burner 32 for obtaining high temperature combustion gas 33 by burning combustion air 30 compressed by an air compressor 31 and fuel, and a gas turbine 34 driven by the high temperature combustion gas 33 obtained in the burner 32 and driving a electric power generator 35 directly coupling to the gas turbine 34.

The exhaust heat recovering boiler system comprises an exhaust heat recovering boiler 37 for obtaining steam by exchanging heat between the exhaust gas 36 exhausted from the gas turbine 34 and feed water. In the exhaust heat recovering boiler 37, a mixed gas heater 38, a steam heater 39, an evaporator 40 (drum 41), an economizer 42 are arranged from the high pressure side of the exhaust gas 36 in this order.

The fuel reforming system comprises a fuel reforming apparatus R1 for obtaining a gas to be reformed by burning a mixed gas 5 supplied through a fuel supply pipe 6 and air 7 supplied from an air supply apparatus 45 (for example, compressor) through an air supply pipe 8 and for obtaining a fuel gas 46 by reforming the gas to be reformed with a reforming catalyst bed 3. The reference character 12 is a cooling medium supply pipe for supplying steam 11 to a cooling jacket 10, the reference character 14 is a fuel outlet pipe for supplying the fuel gas 46 obtained by the fuel reforming apparatus R1 to the burner 32.

The electric power generating system according to the present invention is constructed as described above, and operates as follows.

At starting of operation, a raw fuel 44 is supplied to the fuel flow passage 1 of the fuel reforming apparatus R1 through the fuel supply pipe 6 and the air 7 obtained by the air supplying apparatus 45 is supplied to the fuel flow passage 1 of the fuel reforming apparatus R1 through the air supply pipe 8. The supplied raw fuel 44 and the supplied air 7 are ignited by a spark plug (not shown) and burned to be changed to an unburned gas 47 having a temperature around several hundreds degrees. The unburned gas 47 obtained in such a manner flows inside the fuel flow passage toward the downstream, and is supplied to the burner 32 through the fuel outlet pipe 14. At this time, the unburned gas 47 heats the reforming catalyst bed 3 installed inside the fuel flow passage 1.

The unburned gas 47 supplied to the burner 32 is mixed with the combustion air 30 supplied from the air compressor 31 to be burned. The combustion produces a high temperature burned gas 33, and the obtained burned gas 33 drives the gas turbine 34 and exhausted from the gas turbine 34 as an exhaust gas after driving the gas turbine 34. The electric power generator 35 directly coupled to the gas turbine 34 is driven by the gas turbine 34.

The exhaust gas 36 exhausted from the gas turbine 34 is supplied to the exhaust heat recovering boiler 37 to exchange the heat with the feed water 43. The feed water 43 is supplied to the economizer 42 by a pump to be preheated by the low pressure exhaust gas 36. The preheated feed water is supplied to the evaporator 40 (drum 41) and changed to steam 11 by being heated with the high pressure exhaust gas 36. The steam 11 is supplied to the cooling jacket 10 of the fuel reforming apparatus R1 through the cooling medium supply pipe 12 to cool the fuel flow passage 1 from the outside.

The steam 11 is also branched from the cooling medium supply pipe 12 and supplied to a steam heater 39 to be heated by the higher pressure exhaust gas 36. The heated steam 11 is mixed with the raw fuel 44 (methane is employed in this embodiment) and supplied to a mixed gas heater 38 to be heated by the highest pressure exhaust gas 36. The mixed gas 5 obtained in such a manner is supplied to the fuel flow passage 1 of the fuel reforming apparatus R1 through the fuel supply pipe 6.

The mixed gas 5 supplied to the fuel flow passage 1 is diffuse-burned (partially oxidized) with the air 7 supplied to the fuel flow passage through the air supply pipe 8. The high temperature gas to be reformed obtained by the diffuse combustion is mixed with the steam 11 having been supplied into the cooling jacket 10 and having cooled the fuel flow passage 1, and adjusted to a temperature suitable for entering the reforming catalyst bed 3, that is, a temperature suitable for the reforming and then allowed to flow into the reforming catalyst bed 3. The gas to be reformed is reformed by the reforming catalyst bed 3 to be changed to the hydrogen enriched gas 13. The hydrogen enriched gas 13 obtained in such a manner is supplied to the burner 32 through the fuel outlet pipe 14. After this time, the hydrogen enriched gas 13 is supplied to the burner 32 as the fuel gas.

According to the embodiment, since the steam 11 obtained from the exhaust heat recovering boiler 37 is supplied to the cooling jacket 10 of the fuel reforming apparatus R1 through the cooling medium supply pipe 12, the fuel flow passage of the fuel reforming apparatus R1 exposed to the high temperature gas is cooled by the steam 11 from the outside. Thereby, the fuel reforming apparatus R1 can be protected from high temperature heat even if the heat load is changed by the load fluctuation of the gas turbine 34. Therefore, the reliability of the electric power generating system can be improved.

Further, according to the embodiment, since the mixed gas heater 38 and the steam heater 39 are provided in the exhaust heat recovering boiler 37 to perform heat exchange of the mixed gas 5 supplied to the fuel reforming apparatus R1 and the exhaust gas 36 exhausted from the gas turbine 34, the heat in the exhaust gas 36 can be effectively recovered. Therefore, the thermal efficiency of the electric power generating system can be improved.

Furthermore, according to the embodiment, since the fuel reforming apparatus R1 has the air supply apparatus 45 for supplying air 7 to the fuel reforming apparatus R1, the air supplied to the burner 32 and the fuel reforming apparatus R1 is supplied from separate air supply apparatuses. Thereby, air flow rates to them can be separately controlled and consequently each of the air flow rates can be changed in a wide range. Therefore, the controllability of the electric power generating system can be improved.

Further, according to the embodiment, since a large amount of steam is supplied to the fuel reforming apparatus R1 by supplying the mixed gas 5 containing the steam 11 to the raw fuel 44 and further by mixing the gas to be reformed with the steam 11 supplied to the cooling jacket 10, the fuel gas 46 supplied to the burner 32 from the fuel reforming apparatus R1 contains steam. By doing so, the combustion temperature in the burner 32 is suppressed by the steam contained in the fuel gas 46, and consequently the yield amount of $NO_x$ can be decreased, that is, the amount of $NO_x$ can be lowered. Therefore, the reliability of the electric power generating system can be improved.

By lowering $NO_x$ yield, an apparatus such as $NO_x$ removal system is not required, and running cost required for $NO_x$ removal such as cost for aqueous ammonia is decreased, and the construction of the electric power generating system can be simplified. Therefore, the cost of the electric power generating system can be decreased.

Further, according to the embodiment, since the fuel reforming apparatus R1 reforms the raw fuel to the gas to be burned containing hydrogen, the burning capability (combustion speed, combustion range) in the burner 32 supplied with the fuel gas 46 is improved. Thereby, since it is possible to add further steam to the burner 32, the output power or the efficiency of the electric power generating system can be improved and the heat-electricity ratio (ratio of thermal power output to electric power output) of the electric power generating system can be widely changed. Therefore, the operability of the electric power generating system can be improved.

Figure 7:
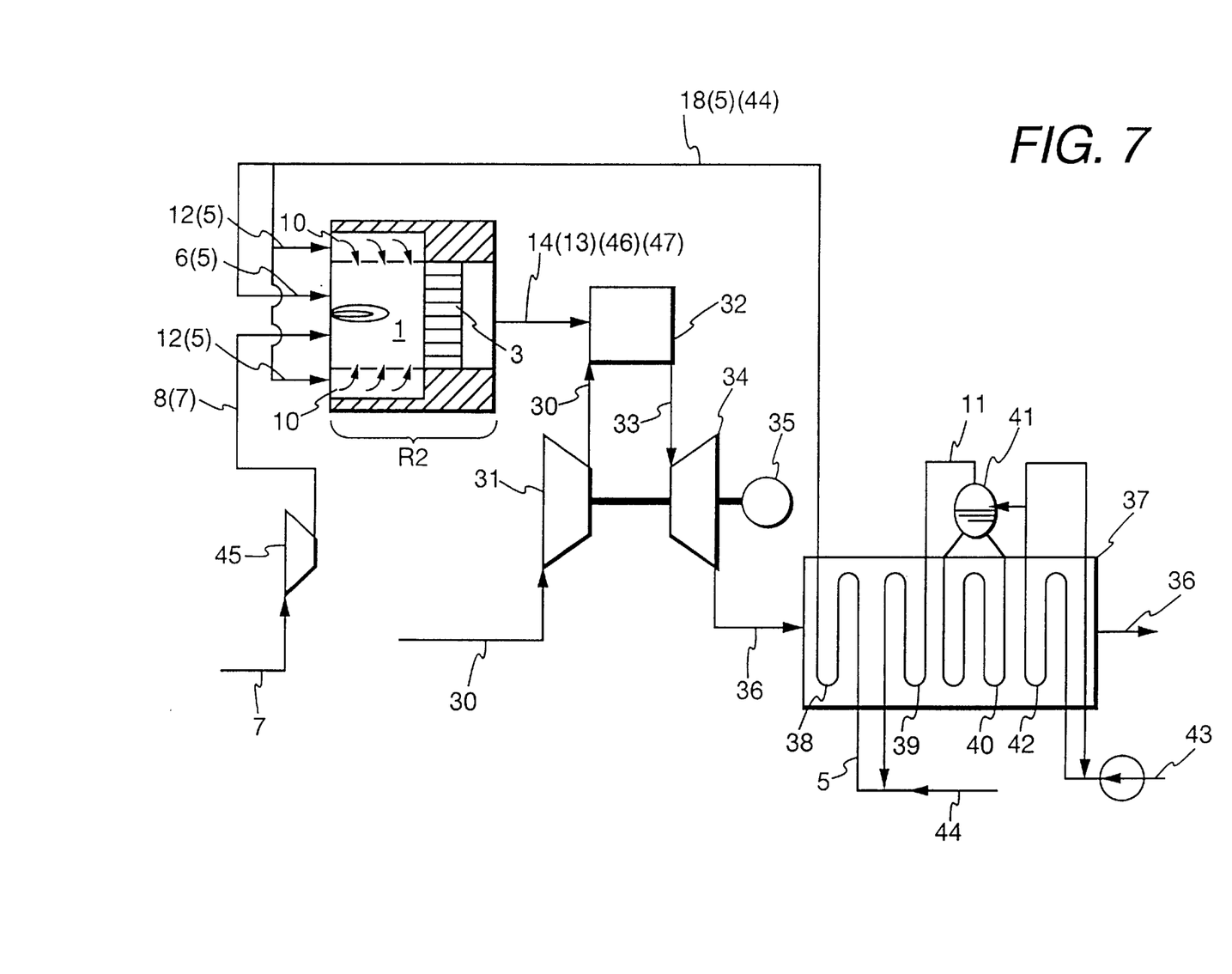
FIG. 7 is a system diagram showing a seventh embodiment of an electric power generating plant having the fuel reforming apparatus of FIG. 2 in accordance with the present invention.

FIG. 7 is a system diagram showing a seventh embodiment of an electric power generating plant having the fuel reforming apparatus of FIG. 2 in accordance with the present invention. Only different points form FIG. 6 will be described below.

In this embodiment, the mixed gas 5 is also supplied to the cooling jacket 10 of the fuel reforming apparatus R2. Therefore, the cooling medium supplying pipe 12 for supplying the cooling medium to the cooling jacket 10 and the fuel supply pipe 6 for supplying fuel to the fuel flow passage 1 are connected to one end side of the common main fuel pipe 18, and the other end of the common main fuel pipe 18 is connected to the mixed gas heater 38.

With the construction as described above, at starting of operation, a raw fuel 44 is supplied to the fuel flow passage 1 of the fuel reforming apparatus R2 through the main fuel pipe 18 and the fuel supply pipe 6, and the air 7 is supplied to the fuel flow passage 1 of the fuel reforming apparatus R2 through the air supply pipe 8. Then the supplied raw fuel 44 and the supplied air 7 are burned. An unburned gas 47 obtained by the partial combustion having a temperature around several hundreds degrees is supplied to the burner 32 after heating the reforming catalyst bed 3 inside the fuel flow passage 1.

The unburned gas 47 supplied to the burner 32 is mixed with the combustion air 30 supplied from the air compressor 31 and burned. Similar to the aforementioned embodiment, the burned gas 33 obtained by the combustion drives the gas turbine 34 and then is supplied to the exhaust heat recovering boiler 37 as an exhaust gas 36 to exchange heat with the feed water 43. The feed water 43 is changed to steam 11 in the evaporator 40 (drum 41), and then mixed with the raw fuel 44 after being heated by the steam heater 39.

The mixed gas 5 obtained by mixing the steam 11 and the raw fuel 44 is heated by the mixed gas heater 38, and supplied to the fuel flow passage 1 through the main fuel pipe 18 and the fuel supply pipe 6 and also supplied to the cooling jacket 10 through the main fuel pipe 18 and the cooling medium supply pipe 12.

The mixed gas 5 supplied to the fuel flow passage 1 is diffuse-burned (partially oxidized) with the air 7 supplied to the fuel flow passage through the air supply pipe 8. The high temperature gas to be reformed obtained by the diffuse combustion is mixed with the steam 11 having been supplied into the cooling jacket 10 and having cooled the fuel flow passage 1, and adjusted to a temperature suitable for entering the reforming catalyst bed 3, that is, a temperature suitable for the reforming and then allowed to flow into the reforming catalyst bed 3. The gas to be reformed is reformed by the reforming catalyst bed 3 to be changed to the hydrogen enriched gas 13. The hydrogen enriched gas 13 obtained in such a manner is supplied to the burner 32 through the fuel outlet pipe 14. After this time, the hydrogen enriched gas 13 is supplied to the burner 32 as the fuel gas.

According to the embodiment, since the mixed gas 5 supplied to the fuel flow passage 1 by branching from the man fuel pipe 18 is supplied to the cooling jacket 10 of the fuel reforming apparatus R2 through the cooling medium supply pipe 12, the fuel flow passage 1 of the fuel reforming apparatus R2 exposed to the high temperature gas is cooled by the mixed gas 5 from the outside. Thereby, the fuel reforming apparatus R2 can be protected from high temperature heat even if the heat load is changed by the load fluctuation of the gas turbine 34. Therefore, the reliability of the electric power generating system can be improved as the same as the above embodiment.

According to the embodiment, the fuel supply pipe 6 and the air supply pipe 8 are connected to one end side of the common main fuel pipe 18 and the other end side of the common main fuel pipe 18 is connected to the mixed gas heater 38, the mixed gas 5 is supplied to the fuel flow passage 1 and the cooling jacket 10. Thereby, a supply pipe for supplying steam from the exhaust heat recovering boiler 37 to the cooling jacket 10 is not required and the construction of the electric power generating system can be simplified. Therefore, the cost of the electric power generating system can be decreased. This construction of electric power generating system is effective to a co-generation system built in a narrow installing area such as in a factory. This construction of electric power generating system may be also applied to a combined plant.

Further, according to the embodiment, since the amount of the steam 11 mixed with the raw fuel 44 is equal to the sum of the amount of the steam mixed with the raw fuel 44 and the amount of the steam mixed with the gas to be reformed supplied to the cooling jacket 10 in the aforementioned embodiment, the amount of the steam supplied to the burner 32 is the same. Therefore, lowering of $NO_x$ can be attained as the same as the aforementioned embodiment.

Figure 8:
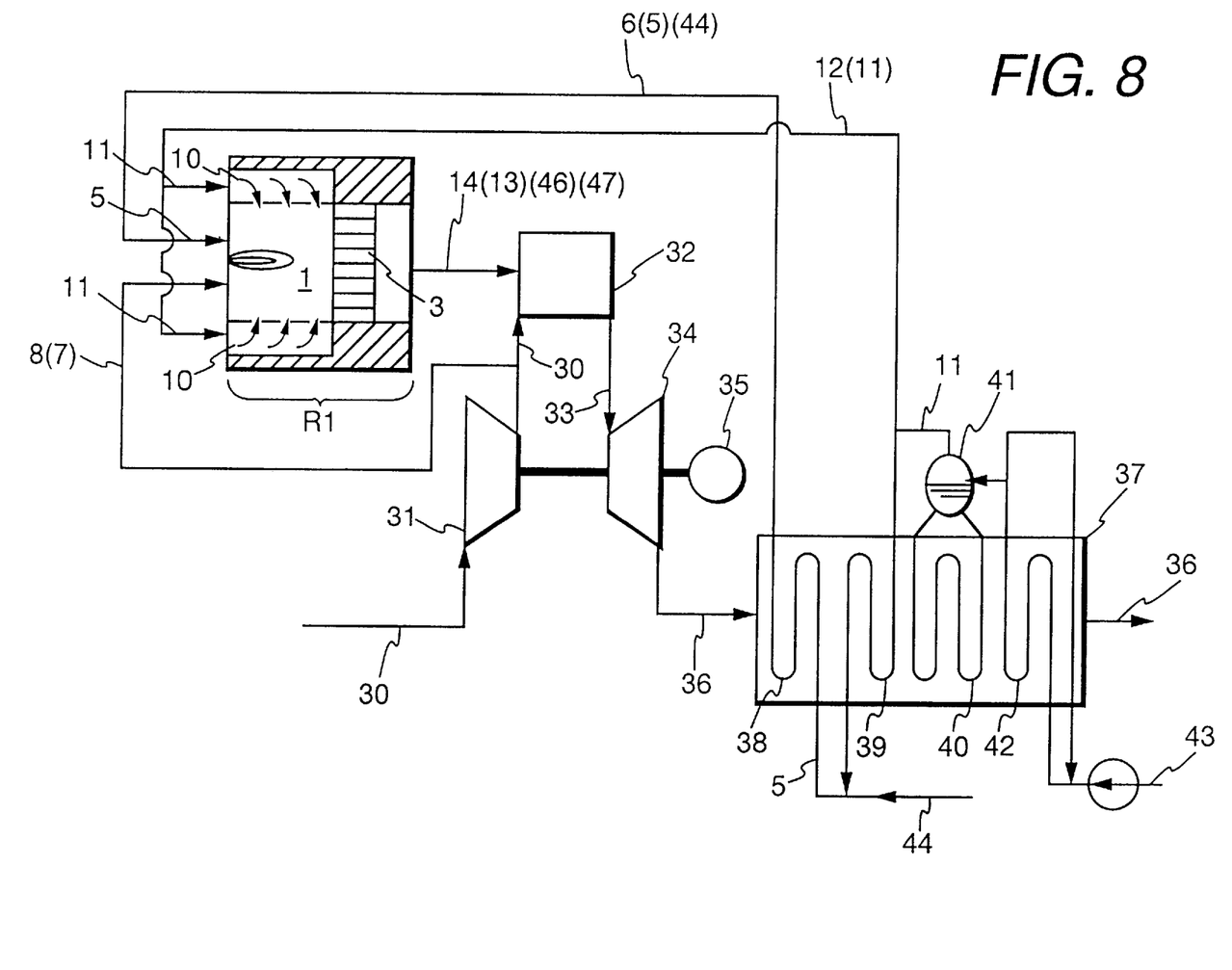
FIG. 8 is a system diagram showing an eighth embodiment of an electric power generating plant having the fuel reforming apparatus of FIG. 1 in accordance with the present invention.

FIG. 8 is a system diagram showing an eighth embodiment of an electric power generating plant having the fuel reforming apparatus of FIG. 1 in accordance with the present invention. Only different points form FIG. 6 will be described below.

In this embodiment, the supply source for supplying air to the fuel reforming apparatus R1 is an air compressor 31 for supplying the combustion air 30 to the burner 32. Accordingly, one end side of the air supply pipe 18 is connected to the pipe for supplying the combustion air 30 compressed by the air compressor 31. In this case, the flow resistance is determined so that the pressure loss of the combustion air 30 flowing from the air compressor 31 to the burner 32 becomes equal to the total pressure loss of the air 7 extracted from the air supply pipe 18 and then supplied to the burner 32 through the fuel reforming apparatus R1.

With the construction as described above, at starting of operation, a raw fuel 44 is supplied to the fuel flow passage 1 of the fuel reforming apparatus R1 through the fuel supply pipe 6 and the air 7 branched from the combustion air 30 compressed by the air compressor 31 is supplied to the fuel flow passage 1 of the fuel reforming apparatus R1 through the air supply pipe 8. Since the operation after this is the same as that of FIG. 6 described above, description will be omitted here.

According to the embodiment, since one end of the air supply pipe 18 is connected to the pipe for supplying the combustion air 30 compressed by the air compressor 31, a part of the combustion air 30 compressed by the air compressor 31 is extracted and supplied into the fuel flow passage 1 of the fuel reforming apparatus R1 through the air supply pipe 18. Thereby, an air supplying apparatus separately provided is not required and the construction of the electric power generating system can be simplified. Therefore, the cost of the electric power generating system can be decreased. This construction of electric power generating system is effective to a co-generation system built in a narrow installing area such as in a factory. This construction of electric power generating system may be also applied to a combined plant.

Further, the following modification can be made for the embodiment.

That is, as shown in FIG. 7, the mixed gas 5 is supplied to the jacket 10 of the fuel reforming apparatus R2, and the cooling medium supply pipe 12 for supplying the cooling medium to the cooling jacket 10 and fuel supply pipe 6 for supplying the fuel to the fuel flow passage 1 are connected to one end side of the common main fuel pipe 18 in the upstream of the main fuel pipe 18, and the other end side of the main fuel pipe 18 is connected to the mixed gas heater 38.

By constructing the above, at starting of operation, the raw fuel 44 is supplied into the fuel flow passage 1 through the main fuel pipe 18 and the fuel supply pipe 6. When steam is generated, the mixed gas 5 is supplied into the fuel flow passage 1 through the main fuel pipe 18 and the fuel supply pipe 6, and the mixed gas 5 is also supplied into the cooling jacket 10 through the main fuel pipe 18 and the cooling medium supply pipe 12.

According to the embodiment, since the fuel supply pipe 6 and the air supply pipe 8 are connected to one end side of the common main fuel pipe 18 in the upstream of the main fuel pipe 18 and the other end side of the main fuel pipe 18 is connected to the mixed gas heater 38, the mixed gas is supplied to both of the fuel flow passage 1 and the cooling jacket 10. Thereby, there is no need to provide a supply pipe for supplying steam from the exhaust heat recovering boiler 37 to the cooling jacket 10, and the construction of the electric power generating system can be simplified. Therefore, the cost of the electric power generating system can be decreased.

Further, according to the embodiment, since the yield amount of $NO_x$ can be decreased as the aforementioned embodiment, the reliability of the electric power generating system can be improved.

Figure 9:
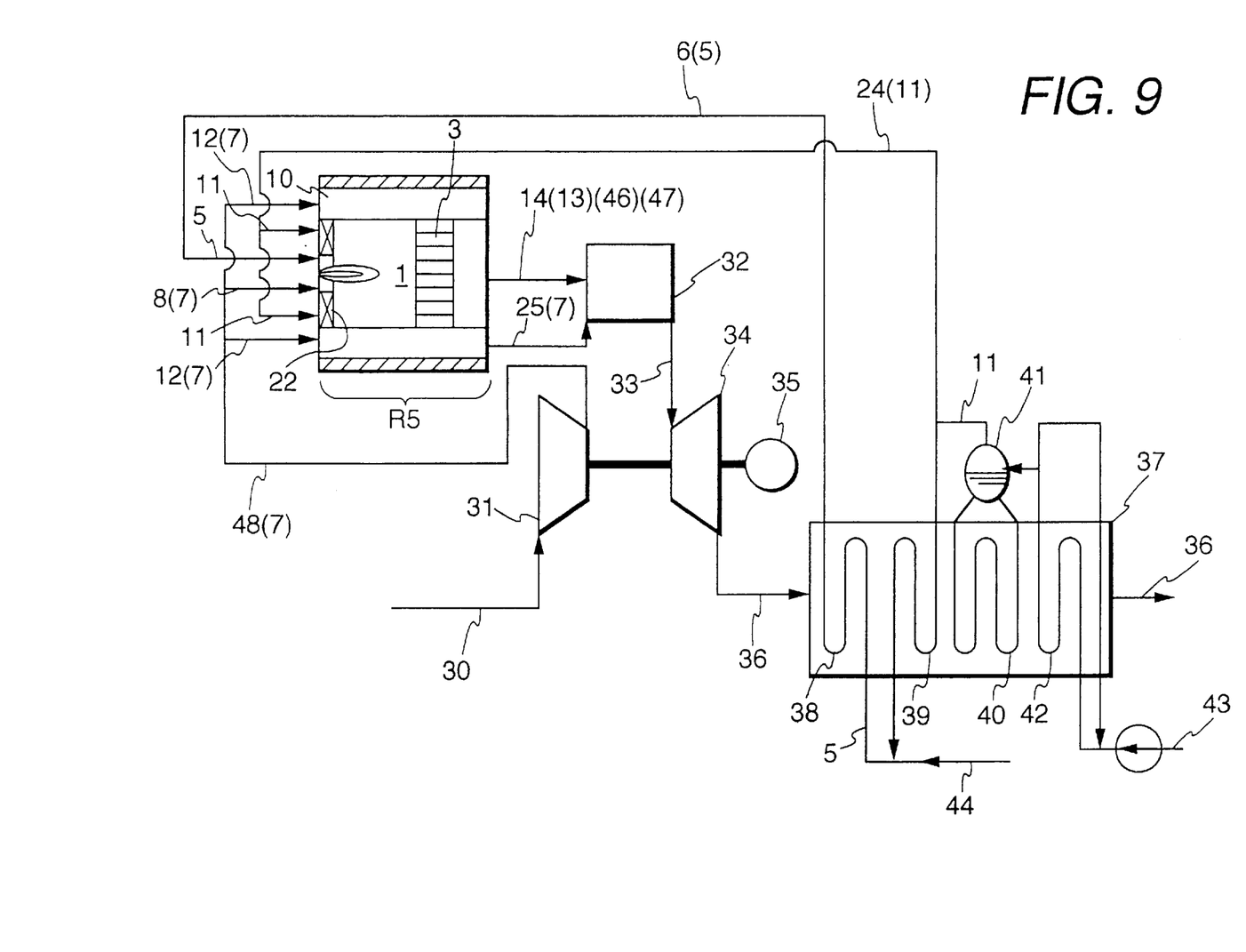
FIG. 9 is a system diagram showing a ninth embodiment of an electric power generating plant having the fuel reforming apparatus of FIG. 5 in accordance with the present invention.

FIG. 9 is a system diagram showing a ninth embodiment of an electric power generating plant having the fuel reforming apparatus of FIG. 5 in accordance with the present invention. This embodiment of the electric power generating system can be roughly classified into a gas turbine system, an exhaust heat recovering system and a fuel reforming system.

The gas turbine system comprises a burner 32 for obtaining high temperature combustion gas 33 by burning combustion air 30 compressed by an air compressor 31 supplied through a fuel reforming system to be described later and fuel, and a gas turbine 34 driven by the high temperature combustion gas 33 obtained in the burner 32 and driving a electric power generator 35 directly coupling to the gas turbine 34.

The exhaust heat recovering boiler system comprises an exhaust heat recovering boiler 37 for obtaining steam by exchanging heat between the exhaust gas 36 exhausted from the gas turbine 34 and feed water. In the exhaust heat recovering boiler 37, a mixed gas heater 38, a steam heater 39, an evaporator 40 (drum 41), an economizer 42 are arranged from the high pressure side of the exhaust gas 36 in this order.

The fuel reforming system comprises a fuel reforming apparatus R5 for obtaining a gas to be reformed by burning a mixed gas 5 supplied through a fuel supply pipe 6 and air 7 supplied from an air compressor 31 through an air supply pipe 8 and for obtaining a fuel gas 46 by reforming the gas to be reformed with a reforming catalyst bed 3. The reference character 12 is a cooling medium supply pipe for supplying air 7 to the cooling jacket 10 and one end of the cooling medium supply pipe 12 is connected to the cooling jacket 10, the reference character 24 is a steam supply pipe for supplying steam 11 into the fuel flow passage 1, the reference character 14 is a fuel outlet pipe for supplying the fuel gas 46 obtained by the fuel reforming apparatus R1 to the burner 32, and the reference character 25 is a cooling medium outlet pipe for supplying air 7 supplied in the cooling jacket 10 to the burner 32.

The electric power generating system according to the present invention is constructed as described above, and operates as follows.

At starting of operation, a raw fuel 44 is supplied to the fuel flow passage 1 of the fuel reforming apparatus R5 through the fuel supply pipe 6. At the same time, the air 7 compressed by the air compressor 31 is supplied to the fuel flow passage 1 through a main air pipe 48, the air supply pipe 8 and air 7 is supplied to the cooling jacket 10 through the main air pipe 48 and the cooling medium supply pipe 12. The supplied raw fuel 44 and the supplied air 7 supplied into the fuel flow passage 1 are ignited by a spark plug (not shown) and burned to be changed to an unburned gas 47 having a temperature around several hundreds degrees. The unburned gas 47 obtained in such a manner flows inside the fuel flow passage toward the downstream, and is supplied to the burner 32 through the fuel outlet pipe 14. At this time, the unburned gas 47 heats the reforming catalyst bed 3 installed inside the fuel flow passage 1. The air 7 supplied into the cooling jacket 10 cools the fuel flow passage 1 from the outside, and is supplied to the burner 32 through the cooling medium outlet pipe 25.

The unburned gas 47 and the air 7 supplied to the burner 32 are mixed and burned. The combustion produces a high temperature burned gas 33, and the obtained burned gas 33 drives the gas turbine 34 and exhausted from the gas turbine 34 as an exhaust gas after driving the gas turbine 34. The electric power generator 35 directly coupled to the gas turbine 34 is driven by the gas turbine 34.

The exhaust gas 36 exhausted from the gas turbine 34 is supplied to the exhaust heat recovering boiler 37 to exchange the heat with the feed water 43. The feed water 43 is supplied to the economizer 42 by a pump to be preheated by the low pressure exhaust gas 36. The preheated feed water is supplied to the evaporator 40 (drum 41) and changed to steam 11 by being heated with the high pressure exhaust gas 36. The steam 11 is supplied to the fuel flow passage 1 through the steam supply pipe 24 and the swirl device 22.

The steam 11 is also branched from the cooling medium supply pipe 12 and supplied to a steam heater 39 to be heated by the higher pressure exhaust gas 36. The heated steam 11 is mixed with the raw fuel 44 (methane is employed in this embodiment) and supplied to a mixed gas heater 38 to be heated by the highest pressure exhaust gas 36. The mixed gas 5 obtained in such a manner is supplied to the fuel flow passage 1 of the fuel reforming apparatus R5 through the fuel supply pipe 6.

The mixed gas 5 supplied to the fuel flow passage 1 is diffuse-burned (partially oxidized) with the air 7 supplied to the fuel flow passage through the air supply pipe 8. The high temperature gas to be reformed obtained by the diffuse combustion is mixed with the steam 11 supplied to the fuel flow passage through the swirl device 22, and adjusted to a temperature suitable for entering the reforming catalyst bed 3, that is, a temperature suitable for the reforming and then allowed to flow into the reforming catalyst bed 3. The gas to be reformed is reformed by the reforming catalyst bed 3 to be changed to the hydrogen enriched gas 13. The hydrogen enriched gas 13 obtained in such a manner is supplied to the burner 32 through the fuel outlet pipe 14. After this time, the hydrogen enriched gas 13 is supplied to the burner 32 as the fuel gas.

According to the embodiment, since the air 7 compressed by the air compressor 31 is supplied to the cooling jacket 10 of the fuel reforming apparatus R5 through the main air pipe 48 and the cooling medium supply pipe 12, the fuel flow passage 1 of the fuel reforming apparatus R5 exposed to the high temperature gas is cooled by the steam 11 from the outside. Further, since the steam 11 obtained by the exhaust heat recovering boiler 37 is supplied to the fuel floe passage 1 through the steam supply pipe 24 and the swirl device 22, the fuel flow passage 1 exposed to the high temperature gas is cooled from the inside. Thereby, the fuel reforming apparatus R5 can be protected from high temperature heat even if the heat load is changed by the load fluctuation of the gas turbine 34. Therefore, the reliability of the electric power generating system can be improved.

Further, according to the embodiment, the air supplied from the air compressor 31 to the burner 32 is supplied through the cooling jacket 10 of the fuel reforming apparatus R6, the air is supplied after cooling the fuel reforming apparatus R5. Thereby, the fuel reforming apparatus R5 is cooled even when the system is starting up. Therefore, the reliability of the electric power generating system can be improved.

Further, according to the embodiment, since the mixed gas heater 38 and the steam heater 39 are provided in the exhaust heat recovering boiler 37 to perform heat exchange of the mixed gas 5 supplied to the fuel reforming apparatus R1 and the exhaust gas 36 exhausted from the gas turbine 34, the heat in the exhaust gas 36 can be effectively recovered. Therefore, the thermal efficiency of the electric power generating system can be improved.

Furthermore, according to the embodiment, since the main air pipe 48 for supplying the air 7 compressed by the air compressor 31 to the reforming system and the air supply pipe 8 and the cooling medium supply pipe 12 are connecting to the main air pipe 48, the air 7 compressed by the air compressor 31 is supplied to the fuel flow passage 1 through the main air pipe 48 and the air supply pipe 8 and supplied into the cooling jacket 10 through the main air pipe 48 and the cooling medium supply pipe 12. Further, since the cooling medium outlet pipe 25 is connected to the burner 32, the air 7 supplied into the cooling jacket 10 is supplied to the burner 32 through the cooling medium outlet pipe 25. Thereby, a separate air supply apparatus for supplying air to the fuel reforming apparatus R5 is not required. Furthermore, since the fuel reforming apparatus R5 and the burner 32 are connected in series and it is possible to construct the fuel reforming apparatus R5 and the burner 32 as a unit, the electric power generating system can be made simple. Therefore, the cost of the electric power generating system can be decreased. This construction of electric power generating system is effective to a co-generation system built in a narrow installing area such as in a factory. This construction of electric power generating system may be also applied to a combined plant.

Further, according to the embodiment, since a large amount of steam is supplied to the fuel reforming apparatus R5 by supplying the mixed gas 5 containing the steam 11 to the raw fuel 44 and further by supplying the steam 11 into the fuel flow passage 1 to mix with the gas to be reformed, the fuel gas 46 supplied to the burner 32 from the fuel reforming apparatus R5 contains steam. By doing so, the combustion temperature in the burner 32 is suppressed by the steam contained in the fuel gas 46, and consequently the yield amount of $NO_x$ can be decreased, that is, the amount of $NO_x$ can be lowered. Therefore, the reliability of the electric power generating system can be improved.

By lowering $NO_x$ yield, an apparatus such as $NO_x$ removal system is not required, and running cost required for $NO_x$ removal such as cost for aqueous ammonia is decreased, and the construction of the electric power generating system can be simplified. Therefore, the cost of the electric power generating system can be decreased.

Further, according to the embodiment, since the fuel reforming apparatus R5 reforms the raw fuel to the fuel gas 46 containing hydrogen, the burning capability (combustion speed, combustion range) in the burner 32 supplied with the fuel gas 46 is improved. Thereby, since it is possible to add further steam to the burner 32, the output power or the efficiency of the electric power generating system can be improved and the heat-electricity ratio (ratio of thermal power output to electric power output) of the electric power generating system can be widely changed. Therefore, the operability of the electric power generating system can be improved.

According to the present invention, since the cooling jacket is arranged adjacent to the fuel flow passage and a cooling medium for cooling the fuel flow passage is introduced into the cooling jacket, the fuel flow passage can be protected from high temperature even if the heat load changes due to the load fluctuation of the gas turbine.

Therefore, it is possible to provide a fuel reforming apparatus having a high reliability which can be applied to a gas turbine electric power generating system. Further, it is possible to provide a electric power generating system having a high reliability with the above fuel reforming apparatus.

What is claimed is:

1. A fuel reforming apparatus comprising a first chamber having a reforming catalyst bed inside, and a second chamber for introducing a cooling medium into said first chamber, said second chamber being arranged adjacent to said first chamber.

2. A fuel reforming apparatus comprising a first chamber for obtaining a gas to be reformed by partially oxidizing a raw fuel and for obtaining a reformed gas by reforming said gas to be reformed using a reforming catalyst bed installed inside said first chamber, and a second chamber for introducing a cooling medium into said first chamber, said second chamber being arranged adjacent to said first chamber.

3. A fuel reforming apparatus comprising a fuel flow passage for obtaining a gas to be reformed by partially oxidizing a raw fuel and for obtaining a reformed gas by reforming said gas to be reformed using a reforming catalyst bed installed inside said fuel flow passage, and a cooling jacket for introducing a cooling medium into said fuel flow passage through several positions, said cooling jacket being arranged adjacent to said fuel flow passage upstream of said reforming catalyst bed.

4. A fuel reforming apparatus comprising a fuel flow passage for obtaining a gas to be reformed by partially oxidizing a raw fuel and for obtaining a reformed gas by reforming said gas to be reformed using a reforming catalyst bed installed inside said fuel flow passage, a cooling jacket for introducing a cooling medium into said fuel flow passage through several positions, said cooling jacket being arranged adjacent to said fuel flow passage upstream of said reforming catalyst bed, and a flow straightener provided in the fuel flow passage upstream of said reforming catalyst bed.

5. A fuel reforming apparatus according to claim 4, wherein said flow straightener holds a combustion catalyst.

6. A fuel reforming apparatus comprising a fuel flow passage for obtaining a gas to be reformed by partially oxidizing a raw fuel and for obtaining a reformed gas by reforming said gas to be reformed using a reforming catalyst bed installed inside said fuel flow passage, and a cooling jacket for introducing a cooling medium into said fuel flow passage through several positions, said cooling jacket being arranged adjacent to said fuel flow passage upstream of said reforming catalyst bed, said fuel flow passage being composed of a plurality of fuel flow passages having different diameters.

7. A fuel reforming apparatus comprising a first chamber for obtaining a gas to be reformed by partially oxidizing a raw fuel and for obtaining a reformed gas by reforming said gas to be reformed using a reforming catalyst bed installed inside said first chamber, a second chamber for introducing a first medium for cooling said chamber, said second chamber being arranged adjacent to said first chamber, swirling means for giving a swirl to a second medium supplied to said first chamber, said swirling means being provided in the first chamber upstream of said reforming catalyst bed.

8. A fuel reforming apparatus comprising a first chamber having a reforming catalyst bed inside, and a second chamber for introducing a cooling medium into said first chamber, said second chamber being an annular chamber surrounding said first chamber.

9. A fuel reforming apparatus comprising a first chamber for obtaining a gas to be reformed by partially oxidizing a raw fuel and for obtaining a reformed gas by reforming said gas to be reformed using a reforming catalyst bed installed inside said first chamber, and a second chamber for introducing a cooling medium into said first chamber, said second chamber being an annular chamber surrounding said first chamber.

10. A fuel reforming apparatus comprising a fuel flow passage for obtaining a gas to be reformed by partially oxidizing a raw fuel and for obtaining a reformed gas by reforming said gas to be reformed using a reforming catalyst bed installed inside said fuel flow passage, and a cooling jacket for introducing a cooling medium into said fuel flow passage through several positions, said cooling jacket being an annular jacket surrounding said fuel flow passage upstream of said reforming catalyst bed.

11. A fuel reforming apparatus comprising:
an annular fuel flow passage having a cylindrical outer contour wall and a reforming catalyst bed provided therein;
a fuel supply pipe for supplying a raw fuel to be oxidized and reformed in said fuel flow passage;
an annular cooling jacket surrounding said fuel flow passage upstream of said reforming catalyst bed for cooling said outer contour wall;
steam supply means for supplying steam into said fuel flow passage along said outer contour wall.

12. A fuel reforming apparatus according to claim 11, wherein said steam supply means comprises a plurality of supply pipes for supplying steam into said cooling jacket and a plurality of injection nozzles in said outer contour wall providing communication between said cooling jacket and said fuel flow passage for injecting steam from said cooling jacket to said fuel flow passage.

13. A fuel reforming apparatus according to claim 11, wherein the steam is supplied through said plurality of supply pipes and through said injection nozzles mixed with fuel.

14. A fuel reforming apparatus according to claim 11, further comprising a flow straightener provided in said fuel flow passage upstream of said reforming catalyst bed.

15. A fuel reforming apparatus according to claim 14, wherein said flow straightener holds a combustion catalyst.

16. A fuel reforming apparatus according to claim 11, wherein said fuel flow passage comprises a plurality of passages having cylindrical outer contour walls of different diameters.

17. A fuel reforming apparatus according to claim 11, further comprising cooling medium supply pipes for supplying a cooling medium to said cooling jacket and cooling medium outlet pipes for exhausting the cooling medium from the cooling jacket, wherein said steam supply means comprises a plurality of steam supply pipes arranged around said fuel supply pipe for supplying steam into said fuel flow passage and a swirl device for expanding the flow of steam from said steam supply pipes to cool an inside of said outer contour wall.

18. A fuel reforming apparatus comprising a reaction chamber in which a fuel reforming reaction is effected, and a cooling chamber for introducing a cooling medium into said reaction chamber, said cooling chamber being arranged adjacent to said reaction chamber.

19. A fuel reforming apparatus according to claim 18, wherein a partition wall having a plurality of holes is provided between said reaction chamber and said cooling chamber for supplying the cooling medium from said cooling chamber into said reaction chamber.

20. A fuel reforming apparatus according to claim 19, wherein an inlet is provided for introducing a mixture of fuel and steam and air into said reaction chamber, and an outlet is provided for discharging a reformed gas from said reaction chamber.

21. A fuel reforming apparatus according to claim 20, wherein said cooling chamber has an inlet for the cooling medium, said cooling medium being a mixture of fuel and steam.

22. A fuel reforming apparatus according to claim 21, wherein a pipe is provided for a mixture of fuel and steam, said pipe communicating with said inlet of said reaction chamber and said inlet of said cooling chamber.

23. A fuel reforming apparatus comprising a fuel flow passage for obtaining a reformed gas in which a mixture gas with fuel flows from an upstream side to a downstream side, said fuel flow passage having an inlet for the mixture gas and air at the upstream side and an outlet for the reformed gas at the downstream side, and a cooling jacket surrounding said fuel flow passage for introducing a cooling medium into said flow passage through a plurality of positions.

24. A fuel reforming apparats according to claim 23, wherein said cooling chamber has an inlet for the cooling medium, said cooling medium being a mixture of fuel and steam.

25. A fuel reforming apparatus according to claim 24, wherein a pipe is provided for a mixture of fuel and steam, said pipe communicating with said inlet of said reaction chamber and said inlet of said cooling jacket.

26. A fuel reforming apparatus according to claim 23, wherein a flow straightener is provided around a downstream end of said cooling jacket.

27. A fuel reforming apparats according to claim 23, wherein said fuel flow passage is composed of a plurality of passages having different diameters.

28. A fuel reforming apparatus comprising a first chamber having a reforming catalyst bed inside it and having a flow direction for gases undergoing reforming from an upstream side to said catalyst bed, a second chamber arranged adjacent to said first chamber containing a first medium for cooling said first chamber on the upstream side of said catalyst bed, means for supplying a second medium is supplied to said first chamber, and swirling means for giving a swirl to said second medium, said swirling means being upstream of said catalyst bed.

29. A fuel reforming apparatus according to claim 28, wherein said first and second chambers are fluidly separated from each other.

30. A fuel reforming apparatus according to claim 28, wherein said reforming catalyst bed is of an endothermic chemical reaction type.

31. A fuel reforming apparatus according to claim 28, wherein said first chamber has a fuel supply nozzle at an upstream end thereof, a fuel outlet at a downstream end and an outer wall between said upstream end and said downstream end, and said second chamber surrounds said first chamber to cool said first chamber at the whole of the outer wall of said first chamber.

* * * * *